(12) United States Patent
Takahashi

(10) Patent No.: US 7,210,687 B2
(45) Date of Patent: May 1, 2007

(54) SHAFT SEAL ASSEMBLY

(75) Inventor: Hidekazu Takahashi, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/393,918

(22) Filed: Mar. 24, 2003

(65) Prior Publication Data
US 2003/0178782 A1   Sep. 25, 2003

(30) Foreign Application Priority Data
Mar. 25, 2002   (JP) .............................. 2002-084155

(51) Int. Cl.
*F16J 15/00* (2006.01)
*F16J 15/40* (2006.01)
*F01D 11/02* (2006.01)
*F01D 11/04* (2006.01)

(52) U.S. Cl. ...................... 277/348; 277/350; 277/362; 277/431

(58) Field of Classification Search ................ 277/348, 277/350, 361–362, 430–432
See application file for complete search history.

(56) References Cited

U.S. PATENT DOCUMENTS

| | | | | |
|---|---|---|---|---|
| 2,877,026 A | * | 3/1959 | Payne et al. ................. | 277/365 |
| 3,591,188 A | * | 7/1971 | Eisner ......................... | 277/366 |
| 3,836,157 A | * | 9/1974 | Hummer ...................... | 277/366 |
| 3,963,247 A | * | 6/1976 | Nommensen ................ | 277/425 |
| 4,406,463 A | * | 9/1983 | Fabrowsky .................. | 277/422 |
| 5,468,002 A | * | 11/1995 | Wasser ......................... | 277/361 |
| 6,186,509 B1 | * | 2/2001 | Wada et al. ................. | 277/363 |
| 6,210,103 B1 | * | 4/2001 | Ramsay ....................... | 415/112 |
| 6,412,822 B1 | * | 7/2002 | Omiya et al. ............. | 285/121.3 |
| 6,494,458 B2 | * | 12/2002 | Uth .............................. | 277/358 |

\* cited by examiner

*Primary Examiner*—Vishal Patel
(74) *Attorney, Agent, or Firm*—Arent Fox LLP

(57) ABSTRACT

A primary technical goal of this shaft seal device is to decrease the pressure of a sealant at a communication passage between a fluid chamber and a first seal portion, to further reduce the pressure by a floating ring, to make the first seal portion pressure-proof for sealing a high pressure process fluid, and to reduce the cost of the shaft seal device by simplifying its structure. The device comprises a fluid chamber being located between the first seal portion and the second seal portion, an intake passage being communicated to a communication passage between the fluid chamber and the first seal portion for allowing a sealant S to flow in, a floating ring being disposed within the fluid chamber and defining a pressure reduction gap between its own inner surface and the rotary shaft, and an outlet passage being communicated to the pressure reduction gap for circulating the pressure reduced sealant.

9 Claims, 4 Drawing Sheets

SHAFT SEAL ASSEMBLY

BACKGROUND OF THE INVENTION

1. Field of the Invention

This invention relates generally to shaft seal devices. This invention relates especially but not exclusively to shaft seal devices for use with a stirrer or the like providing for a seal of a stirred fluid under a high pressure or extremely high pressure.

2. Description of the Related Art

A shaft seal device as a relative art of the present invention is illustrated in FIG. 4. FIG. 4 is a half cross-sectional view of a high pressure mechanical seal device.

In FIG. 4, a rotary shaft 175 is supported in a rotary movable manner by a bearing portion which is disposed in a housing 151 of the stirrer 150. The rotary shaft 175 extends throughout the inside and the outside of the housing 151. The inside of the stirrer 150 is filled with a high pressure sealing fluid A.

The housing 151 through which the rotary shaft 175 extends is divided into three chambers 152A, 152B and 152C. The chamber 152 comprises, counted from the sealing fluid A side, a first chamber 152A, a second chamber 152B and a third chamber 152C.

When the pressure of the sealing fluid A is 20 MPa say, a pressure fluid of 15 MPa which is a little lower than that of the fluid A is fed to the first chamber 152A from a first pipe 153A. Similarly, a pressure fluid of 10 MPa which is further lower than the pressure of the first chamber 152A is supplied to the second chamber 152B from a second pipe 153B. Likewise, a pressure fluid of 5 MPa which is yet lower than the pressure of the second chamber 152B is supplied to the third chamber 152C from a third pipe 153C. Therefore, a plurality of chambers are necessarily disposed in such a manner that the high pressure of the sealing fluid A is decreased step by step.

Without such an elaborate means, a high pressure may cause a damage to the first mechanical seal 110.

The first chamber 152A, second chamber 152B and third chamber 152C contain respective mechanical seal devices 110, 120, 130 within, and these mechanical seal devices 110, 120, 130 are, respectively, referred to, from the sealing fluid A side towards the atmospheric region, a first mechanical seal 110, a second mechanical seal 120 and a third mechanical seal 130.

The first mechanical seal 110 is a high pressure mechanical seal due to a high pressure nature of the sealing fluid A. Likewise, high pressure mechanical seals are used for the third mechanical seal 120 as well as the second mechanical seal 130 in accordance with a level of the pressure to which they are subjected.

Sealing fluid A used in a stirrer 150 is a high pressure, and mechanical seal devices 110, 120, 130 are typically employed because elastic rubber seals cannot sustain such a high pressure.

These mechanical seals 110, 120, 130 are specifically provided for a high pressure use, and they are mounted in such a way that a shaft sleeve 111 is fitted over the rotary shaft 175 via an O-ring. A spring support 112 engages the sleeve 111 at the shoulder part of the sleeve 111, and a rotary seal ring 113 is fitted to the other end of the sleeve 111 in a movable manner via an O-ring. A biasing spring 114 supported by the spring support 112 is disposed to exert an urging force to the rotary seal ring 113.

On the other hand, a stationary seal ring 115 is fitted to a retaining portion of the housing 151 via an O-ring which has an opposing seal face 155A making a sealing contact with a slidable seal face 113A of the rotary seal ring 113.

The second mechanical seal 120 and the third mechanical seal 130 are constructed in a similar manner to the way that the first mechanical seal 110 is constructed.

The first mechanical seal 110 effectively seals the high pressure sealing fluid A within the stirrer in cooperation with the fluid pressure within the first chamber 152A which is a little lower than the pressure of the fluid A.

Likewise for the second mechanical seal 120, it seals the pressure fluid within the first chamber 152A in cooperation with the fluid pressure within the second chamber 152B which is two-step lower than the pressure of the fluid A. Similarly, the third mechanical seal 130, it seals the pressure fluid within the first chamber 152B in cooperation with the fluid pressure within the second chamber 152C which is three-step lower than the pressure of the fluid A.

Use of such high performance mechanical seals, which reduce the fluid pressure in a stepwise manner from chamber to chamber, is essential to provide a secure seal for the sealing fluid A under a high pressure. In other words, when sealing a high pressure fluid, without gradually reducing the high pressure in multiple steps, a single mechanical seal device cannot sustain such a high fluid pressure and will be worn out or damaged at its early stage.

A number of expensive mechanical seals are needed in order to realize such a mechanical seal device in multiple steps and this makes a sealing construction larger and longer. In addition, if one of the multiple mechanical seals is in failure, a pressure differential between the two adjacent mechanical seals becomes large and the increased pressure differential causes other individual mechanical seals to fail. Also a mechanical seal arranged in such a multiple step structure imposes difficulties in machining for mounting the mechanical seals as well as an assembly of the mechanical seal device. This increases a fabrication cost.

Furthermore, providing a fluid of distinct pressures to individual chambers so that the pressure is varied in multiple steps requires a cost increase due to pumps and their related controllers. A modulation of the fluid pressure is also difficult.

The present invention is introduced to resolve the above mentioned problems. A primary technical goal which this invention tries to achieve is to reduce the number of mechanical seals for use and to provide for a seal of a high pressure fluid by utilizing inexpensive mechanical seals while avoiding a total cost increase of a shaft seal device which is caused by employing a plurality of expensive mechanical seals.

Sealing a high pressure fluid by means of a plurality of mechanical seal devices will lead to a large construction because of a disposition of many chambers for retaining the seals. Therefore, another goal of the present invention is to reduce the size of the shaft seal device by making the installation space compact.

Yet another goal for the present invention is to provide a shaft seal device with enhanced pressure proof and seal performance against a high pressure fluid as well as failure prevention induced by the fluid pressure.

SUMMARY OF THE INVENTION

A primary object of the present invention is to resolve the above mentioned technical problems, and a solution to such problems is embodied as follows.

A preferred shaft seal device in accordance with the principles of the present first invention is a shaft seal device for providing a seal against a process fluid between a housing and a rotary shaft, the shaft seal device comprising:

a) a first seal portion being located toward a process fluid and sealing the process fluid;

b) a second seal portion being located on the opposite side of the process fluid relative to the first seal portion;

c) a fluid chamber being located between the first seal portion and the second seal portion;

d) an intake passage allowing a sealant to flow in by communicating with a communication passage between the fluid chamber and the first seal portion;

e) a floating ring being located within the fluid chamber and disposing a pressure reduction gap between the floating ring and the rotary shaft; and f) an outlet passage communicating with the pressure reduction gap and allowing the sealant to be ejected.

In a shaft seal device related to the present invention, the floating ring decreases a high pressure sealant opposing to a process fluid and one side of the first seal portion is made pressure proof via pressure of the sealant. Thus, the floating ring is not required to possess a sealing function, hence only strength and abrasion resistance need to be taken into account. As a consequence, a combination of a low cost seal and a floating ring which provides a substantial pressure reduction effect will easily be able to materialize a shaft seal device with significant seal performance as well as durability which cannot be achieved by a conventional seal device where only a sealing function is considered.

As the floating ring decreases the pressure of the sealant before transmitting to the second seal portion, the second seal portion can be prepared in a low pressure specification, which yields a cost reduction.

Furthermore, even one piece of the floating ring can reduce a high pressure fluid and this leads to a saving for the installation space of the floating ring. This will result in an easy installation structure as well as more a compact shaft seal device.

Also the sealant pressure is effectively reduced in the communication passage which is located upstream of the floating ring because the sealant is blocked by the floating ring.

DETAILED DESCRIPTION OF THE INVENTION

Described below is details of the figures of preferred embodiments of a shaft seal device constructed in accordance with the principles of the present invention. All the figures explained below are constructed according to actual design drawings with accurate dimensional relations.

Figure 1:
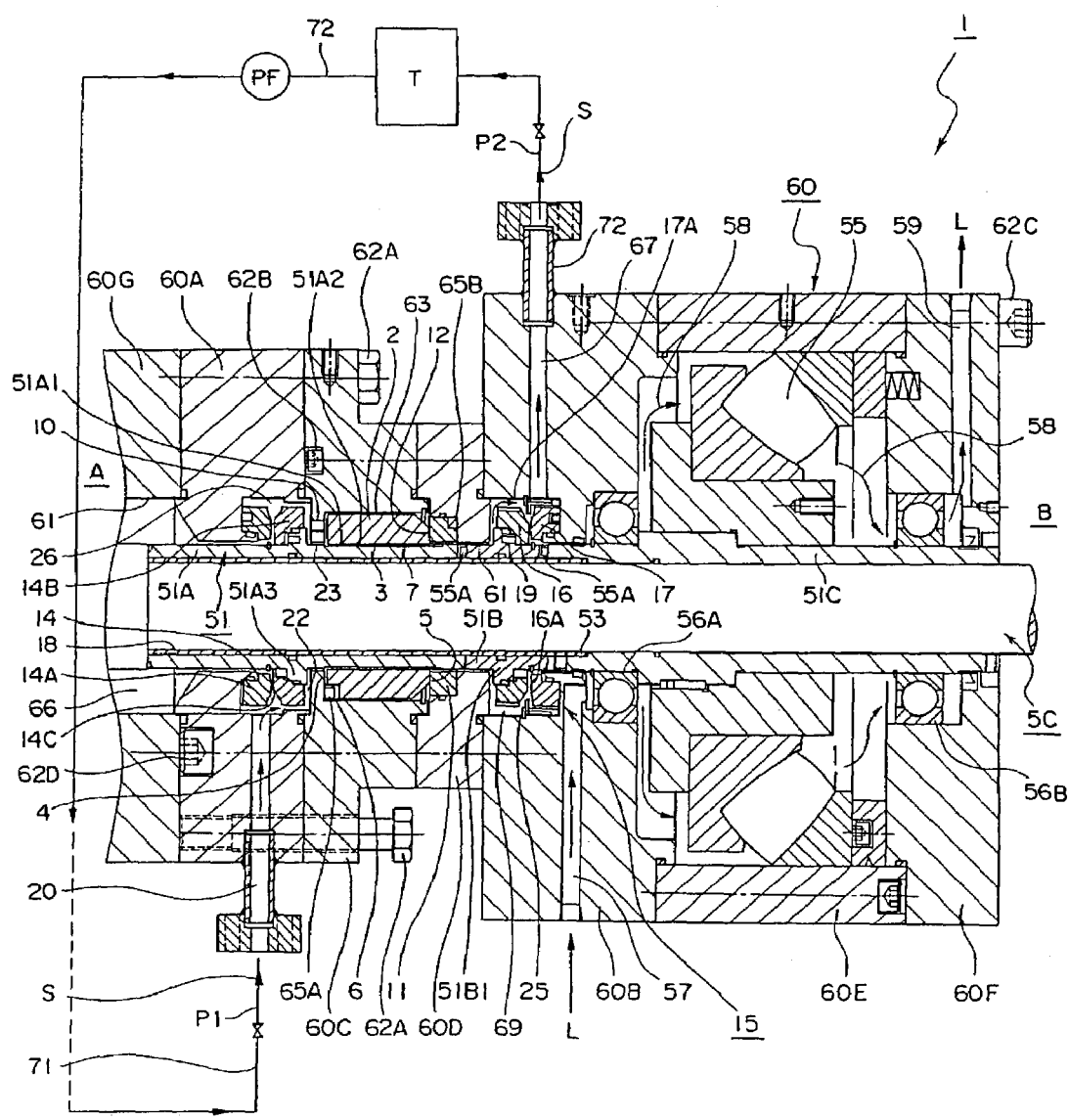
FIG. 1 is a cross sectional view of a shaft seal device as a first embodiment according to the present invention.

FIG. 1 is a cross sectional view of a shaft seal device as a preferred embodiment according to the present invention.

In FIG. 1, a housing 60 disposes a through hole 61 through which a rotary shaft 50 extends. The housing 60 is comprised of a first housing 60A, a second housing 60B, a third housing 60C, and a fourth housing 60D. These housings are integrally joined together by means of a screw bolt 62D.

Disposed further to the right of the figure are a cylindrical fifth housing 60E and a sixth housing 60F which is an end cover. The fifth housing 60E and the sixth housing 60F are secured to the second housing 60B by means of a screw bolt 62C.

The individual housings 60A, 60B, 60C, 60D, 60E, 60F are securely installed to a base housing 60B by means of screw bolts 62A. A seal housing 60 is constituted by the first housing 60A, the second housing 60B, the third housing 60C and the fourth housing 60D. Also the fifth housing 60E and the sixth housing 60F define a bearing housing 60.

The seal housings 60A, 60B, 60C, 60D combined with the bearing housing 60E, 60F constitute the entire housing 60.

An interior portion 66 of the base housing 60G communicating with a device interior A is disposed to the left side in the figure relative to the through hole 61 of the housing 60. An installation chamber 26 for a first seal is defined as an inner circumferential groove disposed toward an atmospheric side B within the first housing 60A, and the installation chamber 26 communicates the interior portion 66 through a gap. Located within the first seal installation chamber 26 is a first seal portion 14. The first seal portion 14 constitutes a mechanical seal. A different kind of seal device such as a segment seal or an O-ring may replace the mechanical seal.

The first mechanical seal 14 comprises a stationary seal ring 14A and a rotary seal ring 14B. The stationary seal ring 14A is retained in a nonrotatable manner by sealingly mating with a protrusion which is disposed in the first housing 60A.

The rotary seal ring 14B, on the other hand, is retained by a flange portion 51A3 of a first sleeve 51A in a nonrotatable but axially movable manner. Mutually opposing seal faces 14C of the stationary seal ring 14A and the rotary seal ring 14B provide a secure seal against a process fluid.

A fluid passage located in the atmospheric side B relative to the opposing seal face 14C of the first seal portion 14 in the first seal installation chamber 26 is communicated to an intake passage 20. This intake passage 20 may be directly communicated to a communication passage 22 which is located between the first seal installation chamber 26 and a fluid chamber 63. Also a narrow gap 23 is disposed between the rotary shaft 50 and the through hole 61 of the third housing 60C toward the fluid chamber 63 relative to the communication passage 22.

A sealant S which is a hydraulic fluid such as salad oil is provided from this intake passage 20. Pressure of the hydraulic fluid is chosen to be similar to or a little lower than that of the sealed process fluid, e.g., lower than the process fluid pressure by a pressure differential in a range of from 0.01 to 0.5 MPa.

The pressure differential relative to the process fluid pressure needs to fall within a designed sealing pressure range of the first seal portion (a range in which its seal performance remains effective). Keeping the pressure differential under the sealing pressure limit helps prevent the first seal portion 14 from being damaged by an excessive pressure of the process fluid.

Furthermore, a fluid chamber 63 is located toward the atmospheric side B relative to the first seal installation chamber 26. Inside the fluid chamber 63, a first fixture pin 65A is secured at one of the end faces which is closer to the device interior 66 while a second fixture pin 65B is secured at the other end face which is closer to the atmospheric side B. In addition, a second seal installation chamber 69 is located in an annular groove in the atmospheric side B relative to the fluid chamber 63.

The housing 60 also disposes an outlet passage 67 communicating with the second seal installation chamber 69.

This outlet passage 67 further communicates with a second pipe fitting 72 which is connected to the second housing 60B. Located downstream relative to the second pipe fitting 72 is an accumulation tank T via a valve V2, which is not shown in the figure. The accumulation tank T then is connected to a pump PF via the second pipe fitting 72. Sealant S whose pressure is reduced by a floating ring 2, which will be described later in details, is fed back to the accumulation tank T via the outlet passage 67 and the second pipe fitting 72.

This sealant S, pumped up to a pressure P1 by means of the pump PF, is fed back from the accumulation tank T to the intake passage 20 via the first pipe fitting 71. Pump PF pressuring the sealant S does not need to be of a special kind, and an ordinary, inexpensive pump will suffice.

Sealant S is thus circulated and returned to the intake passage 20 after the pressure being decreased in the fluid chamber 63. The pressure of the sealant S is delivered at 40 MPa from the intake passage 20 into the first seal installation chamber 26 and is then transmitted into the fluid chamber 63 via the communication passage 22 which is located between the first seal portion 14 and the fluid chamber 63. As the communication passage 22 has a narrow gap 23 between the rotary shaft 50 and the through hole 61 toward the fluid chamber 63 side, the pressure of the sealant S is reduced at the gap 23 as well.

The floating ring 2 which is described later reduces the pressure of the sealant S from P1, 40 MPa, to P2, in a range of from 0.1 MPa to 3 MPa, when passing through the fluid chamber 63.

Effect of the pressure reduction is even more significant with a higher viscosity of the sealant S. Also narrowing a pressure reduction gap 7 between the floating ring 2 and the rotary shaft 50 will result in more significant pressure reduction effect in conjunction with the viscosity.

The floating ring 2 is disposed within the fluid chamber 63 and its inner diameter surface defines a pressure reduction inner surface 3. The pressure reduction gap 7 is located between the pressure reduction inner surface 3 of the floating ring 2 and the outer diameter surface 51A1 of a first sleeve 51A which is fitted over the rotary shaft 50. This pressure reduction gap 7 exhibits a pressure reduction effect in accordance with the axial length of the floating ring 2 as well as the viscosity and the flow rate of the sealant S, e.g., salad oil.

Use of a labyrinth seal on the pressure reduction inner surface 3, which will be described later with an example, can enhance a pressure reduction effect. A labyrinth seal disposed on the pressure reduction inner surface 3 helps decrease the axial length of the floating ring 2, which in turn will lead to a more compact design. Furthermore, arranging the pressure reduction inner surface 3 for a tapered surface will intensify the pressure reduction effect.

The size of the diameter of the floating ring 2 also has an influence on the pressure reduction effect.

Design of the floating ring 2 is conducted by taking these data into account. Dimension of the pressure reduction gap 7 between the floating ring 2 and the rotary shaft 50 falls in a range of from 0.01 mm to 0.5 mm, more referably in a range of from 0.05 mm to 0.2 mm.

The floating ring 2 has an opposing end face 4, which is located to the entrance side where the sealant S flows in, being adjacent to the end face of the fluid chamber 63. Also the other end face of the floating ring 2 which is located toward the atmospheric side B defines a seal face 5. This seal face 5 forms a sealing contact with an opposing seal face 12 of a stationary ring 11 by being urged by a plurality of coil springs 10 which are arranged in a circumferential direction between the end face of the fluid chamber 63 and the opposing end face 4.

Furthermore, the opposing end face 4 disposes a first mating concave 6, and mating of the first mating concave 6 with the first fixture pin 65A retains the floating ring 2 in nonrotatable manner relative to the rotary shaft 50. And the floating ring 2 is retained in a freely movable manner toward a radial, outward direction with respect to the outer diameter surface 51A1 of the first sleeve 51A.

The stationary ring 11 is disposed in the fourth housing 60D toward the atmospheric side B relative to the floating ring 2. This stationary ring 11 has a second mating concave on the end face which is on the other side of the opposing seal face 12, and the second mating concave mates with the second fixture pin 65B which is fixed in the fourth housing 60D. The stationary ring 11 is a part of the floating ring 2, and a gap between the stationary ring 11 and the first sleeve 51A is arranged more or less equal to the pressure reduction gap 7 of the floating ring 2. Any metal which possesses a sufficient strength can be used for the floating ring 2 and the stationary ring 11, e.g., SiC, ceramics or super hard alloys. The seal face 5 is not allowed to rotate relative to the opposing seal face 12, only being allowed for a minor radial displacement.

A second seal portion 15 is disposed in the second seal installation chamber 69 which is located to the atmospheric side B relative to the floating ring 2. The second seal portion 15 constitutes a mechanical seal.

This mechanical seal 15 seals the sealant S by a sealing contact of the seal face 16A of the rotary seal ring 16 and the opposing seal face 17A of the stationary seal ring 17.

On the outer circumferential portion of the second seal installation chamber 69, a dam 25 is disposed to cool down the relatively sliding surfaces 16A, 17A. The sealant S coming in from the direction of the floating ring 2 is guided by the dam 25 towards the mechanicals seal 15 for a close contact to cool down the friction heat which is generated between the seal face 16A and the opposing seal face 17A.

As an alternative example for the second seal portion 15, a seal device generally known as a segment seal can be used in which the segment seal comprises a carbon seal ring with a square section, a cover ring connected to the outer diameter surface of the seal ring, and a garter spring fitted over the outer diameter surface of the cover ring. The second seal portion 15 not only prevents a pressure reduced sealant S with the floating ring 2 from leaking to the atmosphere B, but also urges the sealed fluid to be ejected to the outlet passage 67.

A rubber-made seal lip can be used for the second seal portion. A purpose of the second seal portion is to prevent a low pressure sealant S from leaking to the atmosphere B. Therefore, one side sealing will suffice for sealing the sealant S alone.

As an example, a rubber-made packing, a rubber-made O-ring or the like can be utilized as well. This will significantly reduce a fabrication cost of the second seal portion 15.

A sleeve 51 is fitted over the rotary shaft 50. This sleeve 51 comprises three components; a first sleeve 51A, a second sleeve 51B and a third sleeve 51C. The first sleeve 51A of the three has a surface treatment on its outer diameter surface 51A1 such as a surface quenching, resin coating or metal plating. The coated layer 51A2 of the first sleeve 51A which is also surface treated exhibits durability against a sliding movement relative to the floating ring 2.

The second sleeve 51B is disposed toward the atmospheric side B relative to the end face of the first sleeve 51A. The second sleeve 51B retains the rotary seal ring 16 such that the seal ring 16 rotates together with the rotary shaft 50. Furthermore, the third sleeve 51C is fitted over the rotary shaft 50 in the atmospheric side B relative to the end face of the second sleeve 51B. In addition, the inner diameter surfaces 18 of the first sleeve 51A and the second sleeve 51B and a part of the inner diameter surface 18 of the third sleeve 51C are fitted with a fixed sleeve 53, and the sleeve 53 is then fitted over the rotary shaft 50. Individual sleeves 51 mate with each other by means of drive pins 55A, 55A and rotate together in an integral manner.

Drive pins fixedly connected to the flange portion 51B1 of the second sleeve 51B mate with the concaves of the rotary seal ring 16 such that the rotary seal ring 16 and the rotary shaft 50 rotate together. The rotary seal ring 16 is urged towards the stationary seal ring 16 by means of a plurality of coil springs which are disposed in the flange portion 51B1. The pressure reduced sealant S flowing in from the direction of the floating ring 2 is sealed by the sealing contact formed by the seal face 16A of the rotary seal ring 16 and the opposing seal face 17A of the stationary seal ring 17.

Pressure of the sealant S thus is decreased by the pressure reduction gap 7 located between the floating ring 2 and the first sleeve 51A.

For example, the pressure of the sealant is 65 MPa and the flow rate is in a range of from 10 to 15 liter/min.

Also the dimension of the pressure reduction gap 7 is in a range of 0.05 to 0.2 mm (good results are obtained with such a dimensional range for the pressure reduction gap 7, but the dimension should be determined based on a variety of factors such as pressure, viscosity and velocity of the sealant S, an axial length and a diameter of the floating ring 2, a shape of the labyrinth and so on).

Experiments of the shaft seal device 1 conducted under this condition show that 65 MPa in the intake passage 20 was reduced to 3 MPa in the second pipe fitting 72. No leakage of the sealant S from the second seal portion 15 was observed, either. Furthermore, neither deformation nor defect was observed and its seal performance is considered to be good.

The third sleeve 51C is supported by bearing 56A, 56B which are mounted in the housing 60. The third sleeve 51C sustains an axial force by means of a thrust bearing 55. The bearing 55 then sustains the pressure due to the process fluid and the sealant S along the axial direction.

A lubricant L is provided from a supply passage 57 to lubricate the bearings 56A, 56B and the thrust bearing 55. This supply passage 57 is communicated to the atmosphere B side relative to the second seal portion 15 in the second seal installation chamber 69. Furthermore, the housing 60 disposes a circulation passage 58 through which the lubricant L is delivered from the second seal installation chamber 69, the bearings 56A, 56B, and the thrust bearing 55 towards an ejection passage 59. The lubricant ejected from the ejection passage 59 is led to a circulation system for a purification process which is not shown in the figure before being fed back by pressure to the supply passage 57 again.

Lubricant provided from the supply passage 57 not only lubricates but also cools down the mechanical seal 15 of the second seal portion, the bearings 56A, 56B and the thrust bearing 55. Pressure of the lubricant L transmitted to the second seal installation chamber 69 resists the pressure of the sealant S via the second seal portion 15, which provides the second seal portion 15 with a pressure proof ability and prevents the sealant S from leaking. Therefore, the second seal portion 15 does not require an advanced sealing function and this will yield a less production cost.

Figure 2:
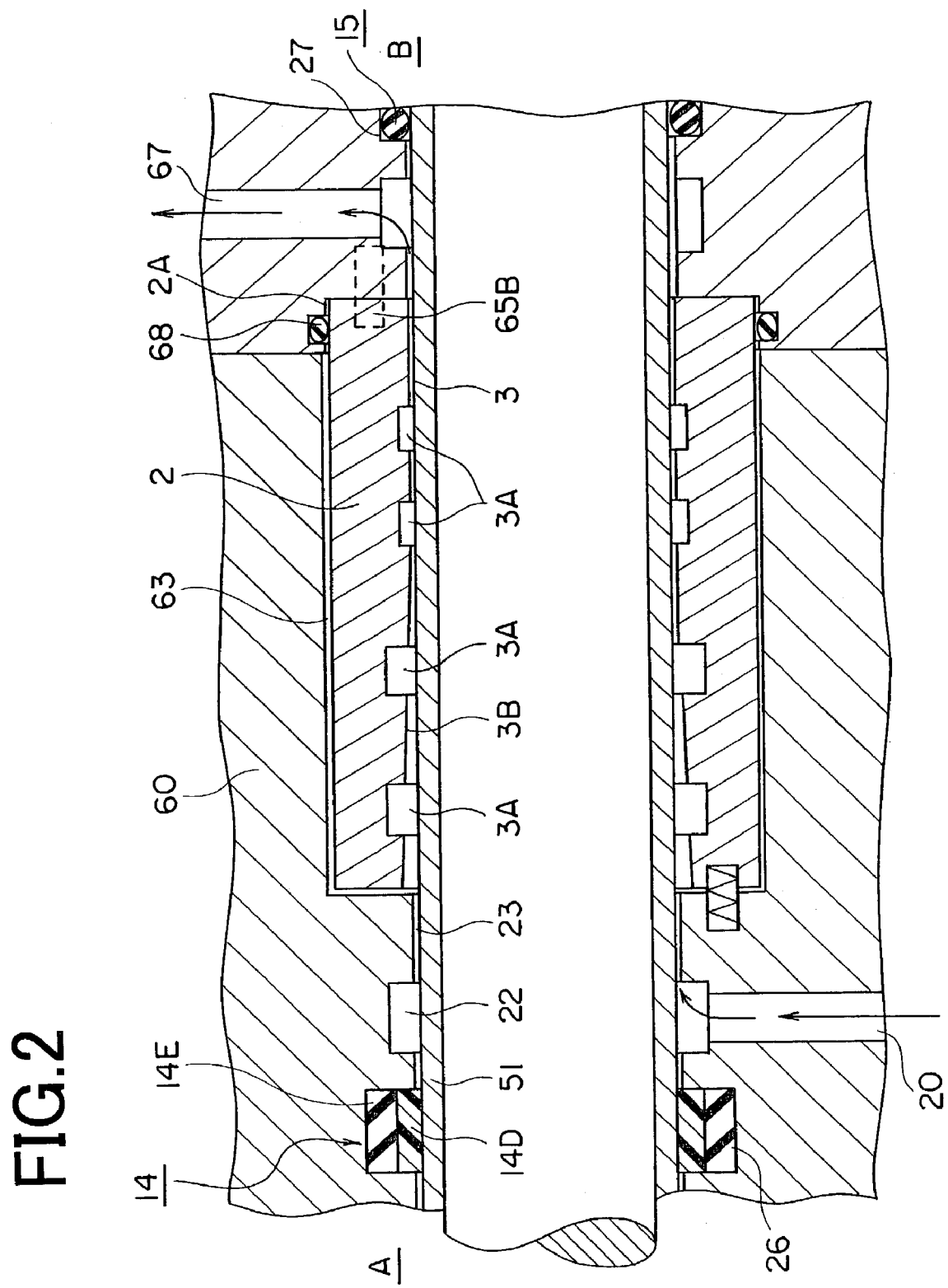
FIG. 2 is a cross sectional view of a key portion of a shaft seal device as a second embodiment according to the present invention.

FIG. 2 shows a cross sectional view of a key portion of a shaft seal device 1 as a second embodiment according to the present invention.

What is shown in FIG. 2 is approximately equal to what appears in FIG. 1 except the floating ring 2, the sleeve 51, location of the outlet passage 67, the first seal portion 14 and the second seal portion 15.

This floating ring 2 does not require a stationary ring 11. For the outer diameter surface of the end portion of the floating ring 2 is fitted to the inner diameter surface of the through hole 61 of the housing 60 via O-ring 68. The O-ring 68 is made of a rubber such as silicone rubber (VMQ), acrylic rubber (ANM) or the like which is elastically deformed with ease.

Furthermore, the pressure reduction inner surface 3 of the floating ring 2 is arranged for a tapered surface 3B. Four sets of irregular labyrinth seals are disposed in the pressure reduction inner surface 3 in FIG. 2.

Floating ring 2 does not require a first fixture pin 65A of FIG. 1. Coil spring in FIG. 1 can either be omitted or be used as it is.

The first seal portion 14 has an integral construction consisting of a rubber made ring 14E and a resin made ring 14D the latter of which forms a slidably sealing contact with the first sleeve 51A. The resin made ring 14D of the first seal portion 14 may be replaced by a carbon made ring. Material of the elastic rubber ring 14E of the first seal portion 14 is, for instance, silicone rubber (VMQ), butyl rubber (IIR), fluorine contained rubber (FKM), or urethane rubber, and so on.

The first seal portion 14, if needed, can be disposed in more than one locations along the axial direction. Number of the first seal portion 14 will be determined based on the characteristics of a process fluid used such as pressure, temperature, type and so on. Packing or O-ring may be used as an alternative if necessary.

Intake passage 20 is communicated to a communication passage 22 which is located between the first seal portion 14 and the fluid chamber 63. A gap 23 is disposed in the fluid chamber 63 side relative to the communication passage 22. The gap 23 decreases a pressure of the sealant S. The pressure decreased sealant S is further decreased by passing through the floating ring 2. The sealant S is ejected from the outlet passage 67 which is located between the fluid chamber 63 and the second seal portion 15.

Figure 3:
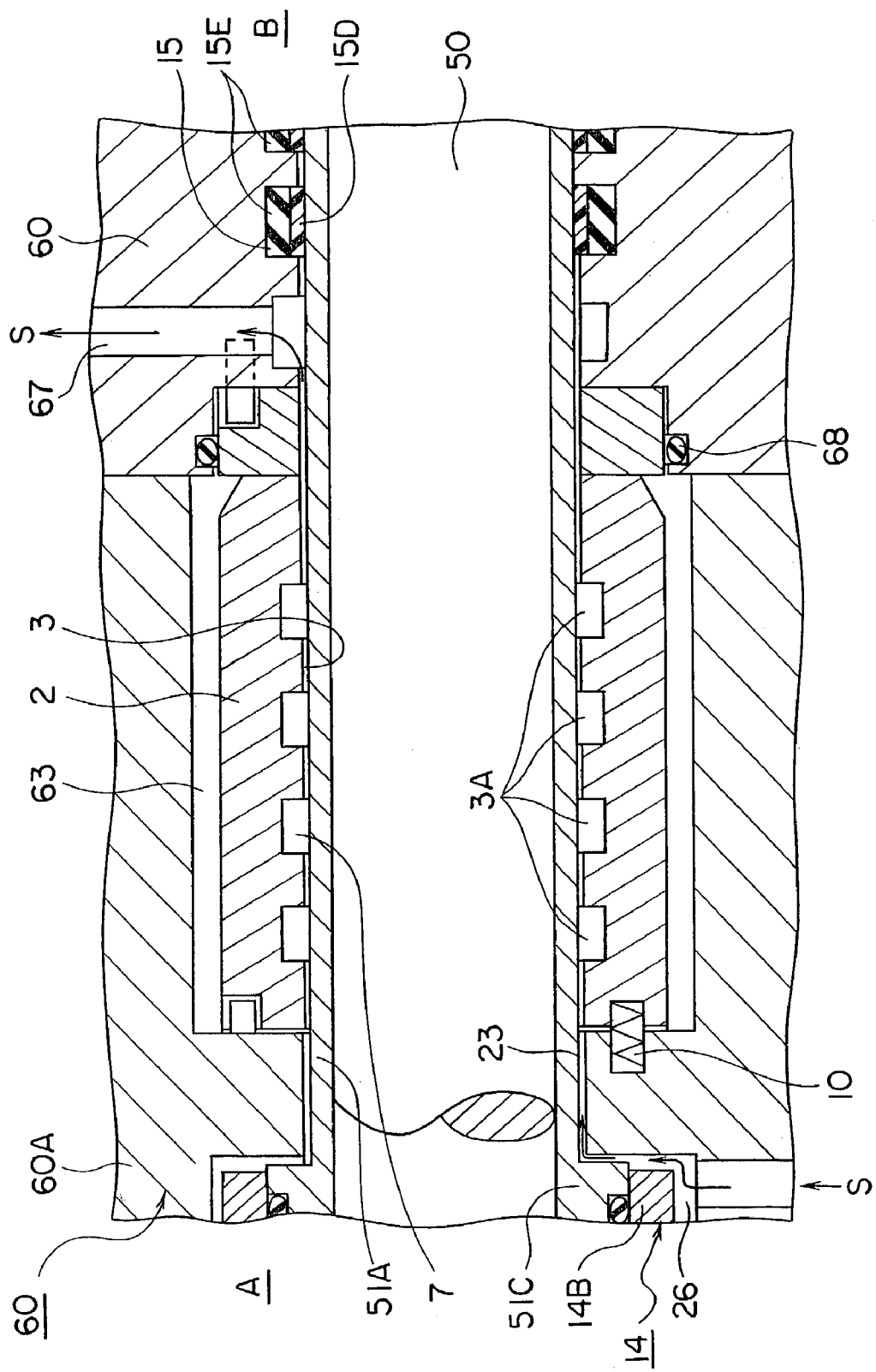
FIG. 3 is a cross sectional view of a key portion of a shaft seal device as a third embodiment according to the present invention.
Figure 4:
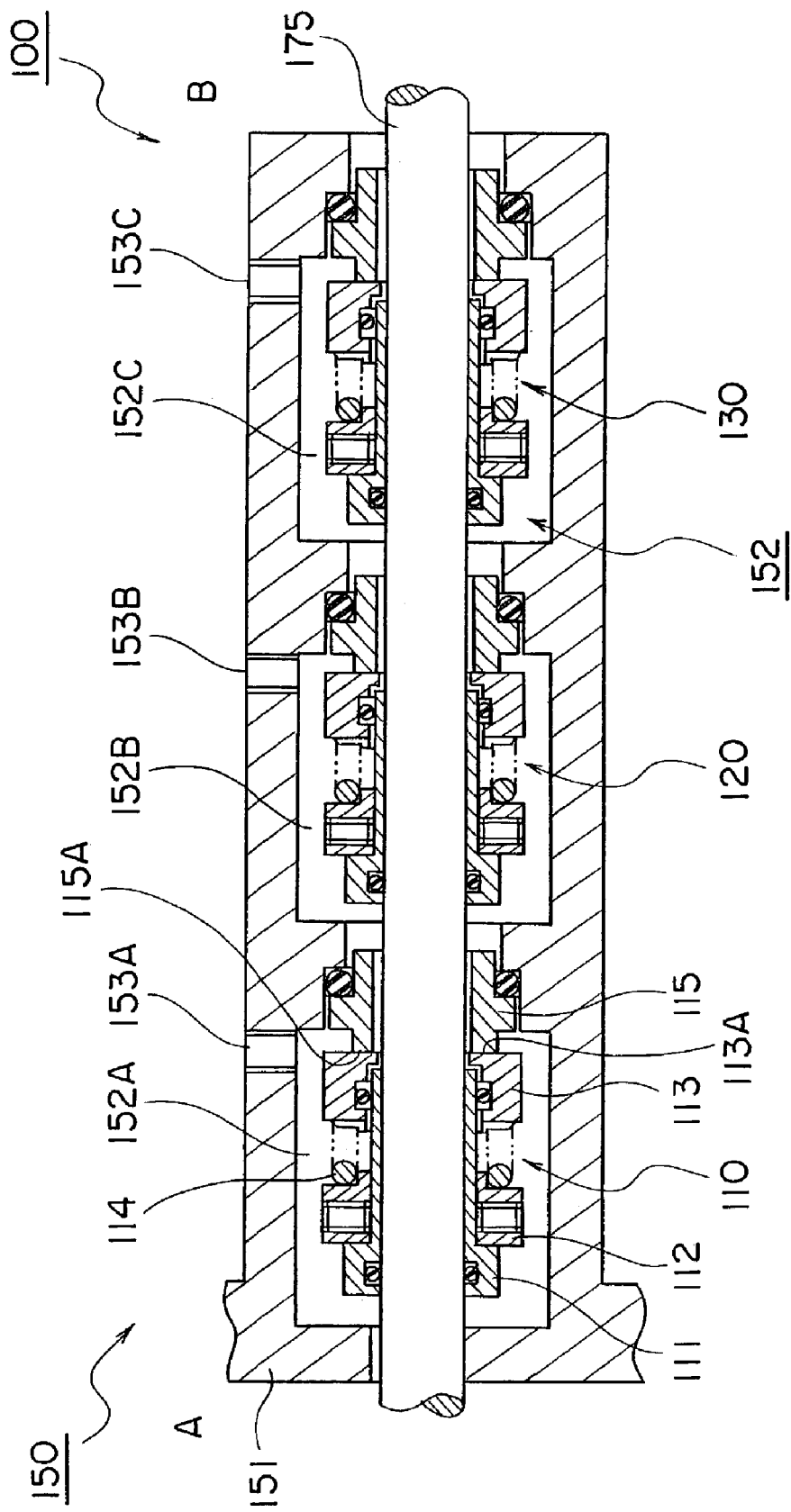
FIG. 4 is a cross sectional view of a shaft seal device of the related art.

FIG. 3 shows a cross sectional view of a key portion of a shaft seal device 1 as a third embodiment according to the present invention.

Shaft seal device in FIG. 3 is arranged similarly to the shaft seal device 1 shown in FIG. 1. What makes a difference is that four sets of irregular labyrinth seals are disposed in the pressure reduced inner surface 3 of the floating ring 2. The number of the labyrinth seals can be one or two. The sealant S whose pressure is nearly equal to or less than the pressure of the process fluid by a range of from 0.1 to 3 MPa is provided from the intake passage 20 which communicates with the first seal installation chamber 26. The sealant S resists against the fluid pressure from the other side via a mechanical seal of the first seal portion 14 to prevent a leakage of the fluid.

The second seal portion 15 has an integral structure consisting of a rubber made ring 15E and a resin made ring 15D the latter of which forms a slidably sealing contact with the first sleeve 51A. The resin made ring 15D of the second seal portion 15 may be replaced by a carbon made ring. Material of the elastic rubber ring 15E of the first seal portion 15 is, for instance, silicone rubber (VMQ), butyl rubber (IIR), fluorine contained rubber (FKM), or urethane rubber, and so on.

The second seal portion 15, if needed, can be disposed in more than one locations. The number of the first seal portion 15 will be determined based on the characteristics of a process fluid used such as pressure, temperature, type and so on. Packing or O-ring may be used as an alternative if necessary. Also the outlet passage 67 is communicated to a portion between the fluid chamber 63 and the second seal portion 15.

Other inventions related to the present invention will be described below.

In a shaft seal device 1 of a second invention related to the present invention, an intake passage 20 communicates with a communication passage 22 which is located between a first seal portion 14 and a fluid chamber 63, and also communicates with a fluid chamber 63 by way of a gap 23 which is formed by a housing 60 and a rotary shaft 50.

In the shaft seal device 1 of the second invention related to the present invention, since the intake passage 20 communicates with the communication passage 22 between the first seal portion 14 and the fluid chamber 63 and then with the fluid chamber 63 via the gap 23 between the housing 60 and the rotary shaft 50, the communication passage 22 which is connected from the intake passage 20 decreases a pressure of the sealant S before the pressure is reduced by a floating ring 2. Further decrease of the pressure is enforced at the gap between the housing 60 and the rotary shaft 50.

Therefore, the pressure can effectively be reduced prior to the floating ring 2 and a potential damage to a first seal portion 14 due to a high pressure of the process fluid is effectively prevented.

This also provides an option of using a low pressure proof material for a floating ring 2. The first seal portion 14 also can be fabricated with a low cost material. As a consequence, a shaft seal device 1 can be prepared compact and inexpensive.

In addition, as the intake passage 20 communicates with the communication passage 22 located between the first seal portion 14 and the fluid chamber 63, the first seal portion 14 can be disposed adjacent to the fluid chamber 63. This leads to a compact design of the entire structure including the first seal portion 14 and the fluid chamber 63.

In a shaft seal device 1 of a third invention related to the present invention, an intake passage 20 communicates with a portion of a first seal installation chamber 26 which is located between a first seal portion 14 and a fluid chamber 63, and a sum of the pressure of the sealant S delivered from the intake passage 20 and the seal proof pressure of the first seal portion 14 is set larger than the pressure of the process fluid.

In the shaft seal device 1 of a third invention related to the present invention, since the intake passage 20 communicates with the first seal installation chamber 26 and a sum of the pressure of the sealant S delivered from the intake passage 20 and the seal proof pressure of the first seal portion 14 is arranged higher than the fluid pressure, even a first seal portion 14 of a low seal performance can effectively sustain the pressure of the process fluid under a high pressure condition. Therefore, the first seal portion 14 can be replaced by a low seal proof packing or the like and a fabrication cost of the shaft seal device 1 can be decreased.

In a shaft seal device 1 of a fourth invention related to the present invention, a mechanical seal is arranged for a first seal portion 14, and a rotary seal ring 14B of the mechanical seal is retained by a sleeve 51 which is supported by a thrust bearing 55.

In the shaft seal device 1 related to the fourth invention, rotary seal rings 14B, 16 are retained in a sleeve 51 which is supported by a thrust bearing 55 in a rotary movable manner. Thus, sliding faces 14C, 16A, 17A for sealing of mechanical seals can precisely be supported. This also enables a use of a pressure proof mechanical seal.

A shaft seal device 1 of a fifth invention related to the present invention disposes bearings 56A, 56B which supports a rotary shaft 50 in a freely rotatable manner in the opposite side of a floating ring with respect to a second seal portion 15, and a circulation passage 58 of a lubricant L which supplies the lubricant to the bearings 56A, 56B communicates with a second seal installation chamber 69 in which the second seal portion 15 is located. The second seal installation chamber 69 further communicates with a supply passage 57 of the lubricant L.

In the shaft seal device 1 related to the fifth invention, since the lubricant L is communicated to the second seal installation chamber 69 in the bearing 56A side relative to the second seal portion 15., a fluid pressure of the lubricant L supplied to the second seal installation chamber 69 hydroelastically supports a low pressure side of the second seal portion 15. Even if the second seal portion 15 is subjected to a pressure of the sealant S, the pressure of the lubricant L can sustain the sealant pressure. Therefore, not only a leakage of the sealant S is prevented, but also a high pressure proof against the sealant is materialized.

Practical effects of the present invention will be explained next.

According to the shaft seal device 1 related to the present invention, the floating ring 2 does not have to be a material which possesses a good seal performance. Choosing a material of high wear resistance and high strength will yield a seal performance as well as durability which a conventional seal device which pursues a seal performance alone cannot satisfy.

When the floating ring 2 is made of a pressure proof material, the material combined with the pressure of a sealant S alone will be enough to sustain the pressure of a process fluid. Low specification seal thus can be used for the first seal portion 14, which decreases the cost.

Furthermore, as one piece of floating ring 2 is sufficient for reducing a high fluid pressure, the shaft seal device 1 can not only be made compact, but also be made simple for the installation of the seal portion.

Pressure of the sealant S is decreased by a pressure reduction gap 7 which is located between the communication passage 22 and the floating ring 2, and the process fluid is sealed via the first seal portion 14 prior to the pressure reduction process. In addition, usage of a sealant S is kept small because the pressure-reduced sealant S is retrieved, hence economical.

Sealant S flows first through the communication passage 22 located between the first seal portion 14 and the fluid chamber 63, then through the gap 23 located between the housing 60 and the rotary shaft 50 before reaching the fluid chamber 63. Therefore, the pressure of the sealant S is decreased at the communication passage 22 which is communicated to the intake passage 20 before being reduced by the floating ring 2. The pressure can be further decreased at the gap between the housing 60 and the rotary shaft 50.

For this reason, the pressure of the sealant S can efficiently be decreased before being decreased at the floating ring 2 and a high pressure of the process fluid is sustained such that a seal ability of the first seal portion 14 is retained against the high fluid pressure. This also provides an option of using a low pressure proof material for a floating ring 2. This further helps to make the device even more compact.

Since the intake passage 20 communicates the first seal installation chamber 26, the pressure of the sealant S which flows into the installation chamber 26 is kept close to that of the process fluid even under a high fluid pressure. Therefore, a pressure differential of the fluid pressure and the sealant pressure is kept within a specification range of the proof pressure of the first seal portion 14. Seal performance of the first seal portion 14 thus can be maintained regardless of high pressure.

In addition, since a lubricant L is communicated to the second seal installation chamber 69 which is located in the bearing 56A side relative to the second seal portion 15, the second seal portion 15 is supported at its opposite side relative to the process fluid by the pressure of the lubricant L which is supplied to the second seal installation chamber 69. Therefore, the second seal portion 15 which is subjected to the sealant pressure is supported from the opposite side by the lubricant pressure. This enables the second seal portion 15 to retain a pressure proof as well as a good seal performance.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A shaft seal assembly for providing a seal between a housing and a rotary shaft, said shaft seal assembly comprising:
    a) a first seal portion located at a first end of said rotary shaft and disposed between said housing and said rotary shaft in a radial direction relative to a longitudinal axis of said rotary shaft;
    b) a second seal portion located at a second end of said rotary shaft opposite to said first seal portion and disposed between said housing and said rotary shaft in said radial direction relative to said longitudinal axis of said rotary shaft process fluid side relative to said first seal portion;
    c) a fluid chamber defined between said first seal portion and said second seal portion in an axial direction relative to said longitudinal axis of said rotary shaft;
    d) an intake passage in communication with a communication passage, said intake and communication passages being defined and located between a first end of said fluid chamber and said first seal portion relative to said longitudinal axis of said rotary shaft;
    e) a floating ring that is axially movable with respect to both the rotary shaft and the housing and includes a pressure reduction inner surface that defines a pressure reduction gap between an inner diameter surface of said floating ring and said rotary shaft, wherein said fluid chamber is defined between an outer diameter surface of said floating ring and an inner diameter surface of said housing;
    f) an outlet passage communicating with said pressure reduction gap;
    g) a sleeve formed directly on the rotary shaft, wherein said first and second seal portions are located directly on an outer circumferential surface of the sleeve and are between an inner circumferential surface of the housing and the outer circumferential surface of the sleeve; and
    h) a biasing member disposed between an inner radial wall portion of said floating ring and an inner radial wall portion of said housing,
    wherein said biasing member urges said floating ring to contact said inner radial wall portion of said housing.

2. The shaft seal assembly according to claim 1 wherein said intake passage is in further communication with said fluid chamber via a gap defined between said housing and said rotary shaft.

3. The shaft seal assembly according to claim 1 wherein said intake passage communicates with a first seal installation chamber located between said first seal portion and said fluid chamber.

4. The shaft seal assembly according to claim 1 wherein said first seal portion is arranged for a mechanical seal and a rotary seal ring of said mechanical seal is retained by a sleeve disposed between said housing and said rotary shaft.

5. The shaft seal assembly according to claim 1 wherein a bearing is disposed in the opposite side of said floating ring with respect to said second seal portion and said bearing supports said rotary shaft in a rotary movable manner and a supply passage communicates with a second seal installation chamber wherein said second seal portion is disposed.

6. The shaft seal assembly according to claim 1, wherein the pressure reduction inner surface of the floating ring has a tapered surface that gradually decreases the pressure reduction gap in a direction approaching the outlet passage.

7. The shaft seal assembly according to claim 1, wherein the pressure reduction inner surface of the floating ring has a labyrinth seal.

8. The shaft seal assembly according to claim 1, wherein the pressure reduction inner surface of the floating ring has a plurality of sets of labyrinth seals disposed along the pressure reduction gap with predetermined intervals therebetween.

9. The shaft seal assembly according to claim 1, further comprising a third seal disposed between at least two of said fluid chamber, said housing and said floating ring.

* * * * *